United States Patent

Sasse

[11] 3,907,887
[45] Sept. 23, 1975

[54] PROCESS FOR THE PREPARATION OF 1-TERT.-BUTYL-THIOSEMICARBAZIDE COMPOUNDS

[75] Inventor: Klaus Sasse, Schildgen, Germany

[73] Assignee: Bayer Aktiengesellschaft, Leverkusen, Germany

[22] Filed: May 2, 1973

[21] Appl. No.: 356,694

[30] Foreign Application Priority Data
May 4, 1972 Germany............................ 2221812

[52] U.S. Cl............. 260/552 SC; 71/90; 260/302 D
[51] Int. Cl.² ........................................ C07C 159/00
[58] Field of Search ............................. 260/552 SC

[56] References Cited
OTHER PUBLICATIONS
Dixon et al., J. Am. Chem. Soc., Vol. 93, No. 13, pp. 3248–3254, (1971).

Primary Examiner—Howard T. Mars
Assistant Examiner—G. Breitenstein
Attorney, Agent, or Firm—Burgess, Dinklage & Sprung

[57] ABSTRACT

1-tert.-butyl-thiosemicarbazide compounds of the formula

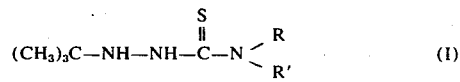

(I)

wherein
R and R' are hydrogen, aliphatic, cycloaliphatic or aromatic hydrocarbyl (optionally substituted) or where an R and R' together with the nitrogen linking them can form a heterocyclic system are produced by reacting a thiosemicarbazide of the formula

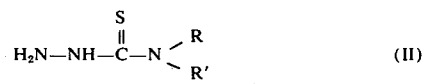

(II)

with tertiary butanol in the presence of a dehydrating agent at a temperature of from 0° to 100°C.

15 Claims, No Drawings

PROCESS FOR THE PREPARATION OF 1-TERT.-BUTYL-THIOSEMICARBAZIDE COMPOUNDS

The present invention relates to a process for the production of certain 1-tert.-butyl-thiosemicarbazide compounds. Such compounds are important intermediates in the preparation of pesticides.

Some 1-tert.-butyl-thiosemicarbazides are already known. These have hitherto all been obtained from tert.-butylhydrazine as the starting material, in yields which in the majority of cases were rather unsatisfactory. For example, according to the literature (Acta chem. Scand. 22, 1 (1968)), 1-tert.-butyl-thiosemicarbazide is obtained from tert.-butylhydrazine and thiocyanic acid in only 7% yield, or from 2-tert.-butyl-thiocarbazine-acid 0-ethyl ester and ammonia, after several months' reaction time, in 30% yield, and finally from tert.-butyl-hydrazine and cyanogen bromide, and subsequent reaction with hydrogen sulfide, in a yield (not specified in more detail) of between 40 and 65%. According to the same literature source, 1-tert.-butyl-4-methyl- and 1-tert.-butyl-4-isopropyl-thiosemicarbazide are obtained in unrecorded yield from tert.-butylhydrazine and the corresponding alkyl isothiocyanates.

A large proportion of these preparative methods is unusable for industrial purposes, if only because of the long reaction time or the low yields. Furthermore, however, all these processes require tert.-butyl-hydrazine, the industrial manufacture of which has not yet been solved satisfactorily. Thus, for large batches, all processes in which the tert.-butyl radical is introduced or completed via Grignard compounds, and which also take place with rather unsatisfactory yields, are probably unapplicable. As examples, there may be mentioned: the reaction of acetonazine with methyl magnesium bromide (see Liebigs Ann. Chem. 547, 24 (1941)); the reaction of tert.-butylmagnesium chloride with azodicarboxylic acid di-tert.-butyl ester (J. Org. Chem. 26, 4336 (1969)). The direct tert.-butylation of hydrazine with tert.-butylchloride (Ber. 74771, (1941)) has also little to recommend it, because of the low yield (less than 10%). Only the synthesis from chloramine and tert.-butylamine which can be carried out analogously to the Raschig hydrazine process (J. Am. Chem. Soc, 76,4869 (1954)), which allegedly yields tert.-butylhydrazine in approximately 70% of yield, would be usable for industrial purposes, but it is known that the manufacture and handling of chloramine requires considerable expenditure on equipment.

The present invention provides a process for the production of a 1-tert.-butyl-thiosemicarbazide of the general formula:

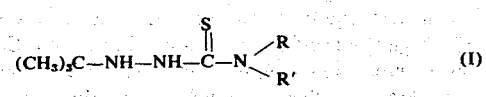
(I)

in which
R and R', which may be identical or different, are hydrogen; an alkyl, alkenyl or alkynyl radical with up to 16 carbon atoms, which radical may optionally be substituted; optionally substituted cycloalkyl with 5 or 6 carbon atoms; aralkyl or aryl, the aromatic rings of the last two radicals being optionally substituted by halogen, alkyl, trifluoromethyl, alkoxy, alkylmercapto, nitro or nitrile; or R and R', together with the nitrogen atom which links them, form a 5-membered or 6-membered ring which can optionally contain oxygen or sulfur as a further hetero-atom in the ring.

The instant process comprises reacting a thiosemicarbazide of the general formula:

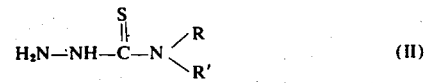
(II)

in which
R and R' have the above-mentioned meanings with tertiary butanol in the presence of a dehydrating agent at a temperature between 0° and 100°C.

Preferably, R and R' are each hydrogen, alkyl with up to 12 carbon atoms, alkenyl or alkynyl with up to 6 carbon atoms (these alkyl, alkenyl and alkynyl radicals being optionally substituted by an alkoxy, aryloxy, alkylmercapto, arylmercapto, alkylsulfonyl, arylsulfonyl, carboxylic ester or carboxylic ester-amide group), cyclopentyl or cyclohexyl (either of these radicals being preferably substituted by methyl), aryl, or aralkyl with up to 4 carbon atoms in the alkyl part and one or two aryl radicals, the aryl radical in the latter case being on the same or different carbon atoms of the alkyl radical (any of the said aryl radicals being preferably substituted by methyl, ethyl, methoxy, methylmercapto, nitro, nitrile, fluorine, chlorine or bromine); or R and R', together with the nitrogen atom which links them, form a pyrrolidine, piperidine, morpholine or thiamorpholine ring.

It must be regarded as distinctly surprising that a tertiary butylation of the hydrazine group in thiosemicarbazides takes place so smoothly and without significant side-reactions, since it is known that tert.-butanol is easily dehydrated to isobutylene under the influence of dehydrating agents and furthermore oligomerises in the nascent state to higher-molecular-weight hydrocarbons; however, compounds of this nature are found as by-products only to a minor degree. Also, it was to be expected that the alkylation reaction would take place at the more nucleophilic sulfur atom rather than at a nitrogen atom. Indeed, it is possible that the reaction takes place via S-tert.-butylation products as intermediates; however, under the reaction conditions and working-up conditions specified here, they are not found as end products of the reaction.

Compared to the prior-art methods, the process according to the invention has the advantages that it does not require any tert.-butyl-hydrazine as an intermediate, that it takes place in good yields and that it can, under mild conditions, be carried out in customary reaction vessels with inexpensive intermediates, such as, for example, tert.-butanol.

If 4-methyl-thiosemicarbazide and tertiary butanol are used as the starting materials, the course of the reaction can be represented by the following equation:

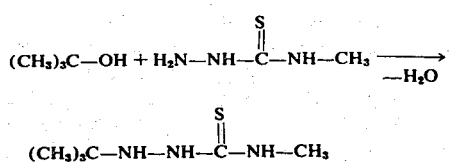

The following may be mentioned as examples of the starting thiosemicarbazides of the formula (II): thiosemicarbazide, 4-methyl-thiosemicarbazide, 4-ethyl-thiosemicarbazide, 4-propyl-thiosemicarbazide, 4-isopropyl-thiosemicarbazide, 4-butyl-thiosemicarbazide, 4-isobutyl-thiosemicarbazide, 4-hexyl-thiosemicarbazide, 4-dodecyl-thiosemicarbazide, 4-(2-ethoxy-ethyl)-thiosemicarbazide, 4-(2-ethylmercapto-ethyl)-thiosemicarbazide, 4-(2-phenoxyethyl)-thiosemicarbazide, 4-(2-phenylmercapto-ethyl)-thiosemicarbazide, 4-(2-ethylsulphonyl-ethyl)-thiosemicarbazide, 4-(2-benzylsulphonyl-ethyl)-thiosemicarbazide, 4-(carbomethoxymethyl)-thiosemicarbazide, 4-(2-carbamido-ethyl)-thiosemicarbazide, 4-allyl-thiosemicarbazide, 4-crotyl-thiosemicarbazide, 4-propargyl-thiosemicarbazide, 4-cyclopentylthiosemicarbazide, 4-cyclohexyl-thiosemicarbazide, 4-(3-methylcyclohexyl)-thiosemicarbazide, 4-benzyl-thiosemicarbazide, 4-(2-phenyl-ethyl)-thiosemicarbazide, 4-diphenylmethyl-thiosemicarbazide, 4-(1,2-diphenyl-ethyl)-thiosemicarbazide, 4-(4-chlorobenzyl)-thiosemicarbazide, 4-(4-trifluoromethylbenzyl)-thiosemicarbazide, 4-(4-methoxybenzyl)-thiosemicarbazide, 4-(4-methylmercaptobenzyl)-thiosemicarbazide, 4-(4-nitrobenzyl)-thiosemicarbazide, 4-(4-cyanobenzyl)-thiosemicarbazide, 4-phenyl-thiosemicarbazide, 4-(2-chlorophenyl)-thiosemicarbazide, 4-(4-bromophenyl)-thiosemicarbazide, 4-(4-fluorophenyl)-thiosemicarbazide, 4-(3,4-dichlorophenyl)-thiosemicarbazide, 4-(2-methyl-4-chlorophenyl)-thiosemicarbazide, 4-(4-trifluoromethylphenyl)-thiosemicarbazide, 4-(4-ethylphenyl)-thiosemicarbazide, 4-(4-methoxyphenyl)-thiosemicarbazide, 4-(4-methylmercaptophenyl)-thiosemicarbazide, 4-(4-nitrophenyl)-thiosemicarbazide, 4-(4-cyanophenyl)-thiosemicarbazide, 4,4-dimethyl-thiosemicarbazide, 4,4-diethyl-thiosemicarbazide, 4-methyl-4-phenylthiosemicarbazide, 4-butyl-4-cyclohexyl-thiosemicarbazide, thiocarbazinic-acid pyrrolidide, thiocarbazinic-acid piperidide, thiocarbazinic-acid morpholide and thiocarbazinic acid thiomorpholide.

The thiosemicarbazides of the formula (II) are largely known. Where they have not previously been described, they can be produced according to methods known from the literature, for example by reaction of isothiocyanates, thiocarbamic acid halides or thiocarbamic acid esters with hydrazine. A list of the hitherto known 4-monosubstituted and 4,4-disubstituted thiosemicarbazides and of the methods for their production is to be found in the literature (Acta chem. Scand. 22, 1 (1968)).

The reaction of this invention can be carried out in the presence of diluents. As such it is possible to use solvents which are inert under the reaction conditions, for example aliphatic or aromatic hydrocarbons and aliphatic and cyclic ethers. In particular, however, the dehydrating agent required for the reaction can be employed in excess and used as the solvent as, for example, in the case of 60 to 96% strength sulfuric acid.

The condensation reaction between the thiosemicarbazide and tert.-butanol is brought about by dehydrating ("water-binding") agents. As such, there are to be understood auxiliaries which produce tert.-butyl cations from the tert.-butanol. Concentrated mineral acids and organic sulfonic acids are especially suitable for this purpose. The reactions take place particularly advantageously under the influence of sulfuric acid, a concentration of at least 60% being necessary for a sufficient reaction speed. Accordingly, a sulfuric acid of 60 to 96% strength is used, the preferred strength being between 70 and 85%, since, when working in this way, the sulfates of the thiosemicarbazides employed or produced are sufficiently soluble to achieve a homogeneous reaction mixture. Since the sulfuric acid of the strength described as a rule simultaneously functions as the reaction medium, its amount employed is not defined in terms of a particular molarity, relative to the thiosemicarbazide. Rather, the amount is prescribed by questions of solubility and homogenisability of the reaction mixtures. As a rule, at least a 4-fold but at most a 10-fold weight of sulfuric acid of the indicated strength is required, relative to the thiosemicarbazide employed.

The reaction temperatures can be varied over a fairly wide range. In general, the reaction is carried out at between 0° and 100°C, preferably between 30° and 70°C.

For a quantitative reaction, at least an eqimolar amount of tert.-butanol is required, relative to the thiosemicarbazide employed. Since possibly a part of the tert.-butanol is converted in a side-reaction into oligomeric iso-butenes, especially in inhomogeneous reaction mixtures at inadequate speeds of stirring or under unfavorable temperature conditions, 1.1 to 1.3 moles of tert.-butanol are advantageously employed. As an exception, the reaction with the unsubstituted thiosemicarbazide to give 1-tert.-butyl-thiosemicarbazide generally requires at least twice the stoichiometric amount, and advantageously 2.2 to 2.5 times the stoichiometric amount, of tert.-butanol in order to achieve satisfactory yields. The sequence in which the reactants are caused to act on one another is largely optional. Thus, for example, tert.-butanol can be introduced into a mixture of the thiosemicarbazide and the acid, or the acid can be introduced into a mixture of tert.-butanol and thiosemicarbazide. All that should be avoided is that tert.-butanol is present in concentrated acid without the simultaneous presence of sufficient amounts of thiosemicarbazide, otherwise oligomeric isobutenes may be produced as the main products.

To isolate the reaction products the reaction mixtures, optionally after dilution with water, are neutralized or rendered weakly alkaline, whereupon the thiosemicarbazides precipitate as a compound which is more or less sparingly soluble in water.

The thiosemicarbazides which can be prepared according to the invention are valuable intermediates for plant-protection agents, for example for herbicides known from the literature (see, on this matter, German Offenlegungsschriften (German Published Specifications) No. 1.670.956, No. 1.770.236 and No. 2.123.266). - For example, 4-methyl-1-tert.-butyl-thiosemicarbazide (cf. EXAMPLE 1 infra) may be converted, by reacting it with phosgene, into 2-(N-methyl-N-chlorocarbonyl-amino)-4-tert.-butyl-1.3.4-thiadiazolin-5-one (in accordance with German Published Specifications Nos. 1.670.956 and 1.770.236), which can easily be converted, by reacting with primary or secondary amines, e.g. methylamine or dimethylamine, into corresponding urea derivatives (in accordance with German Published Specification No. 1.770.236). Such urea derivatives are known to be useful herbicides (see German Published Specifications No. 1.770.236 and, in particular, No. 2.123.266).

In the following, two typical examples are given for the preparation of herbicidal urea compounds starting from 4-methyl-1-tert.-butyl-thiosemicarbazide:

a. Preparation of 2-(N-methyl-N-chlorocarbonyl-amino)-4-tert.-butyl-1.3.4-thiadiazolin-5-one

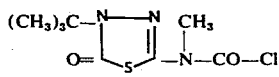

161 g (1 mol) of 4-methyl-1-tert.-butyl-thiosemicarbazide are suspended in 700 ml of chlorobenzene. Phosgene is gradually introduced at room temperature, the temperature rising to 40° to 45°C. At the same time the suspension initially thickens and then later thins out. After subsidence of the exothermic effect, the mixture is heated by external means in order to maintain a temperature of 40° to 45°C. After about 220 g of phosgene (2.2 mols) have been introduced, a clear solution has formed. Heating is slowly continued up to 100°C in a weak stream of phosgene and this temperature is maintained for a further hour. The solution is evaporated in a vacuum. There remains a residue of 2-(N-methyl-N-chlorocarbonylamino)-4-tert.-butyl-1.3.4-thiadiazoline-5-one in practically quantitative yield. Recrystallized from petrol for cleaning, the purified product is obtained in 90% yield. m.p. 65°C.

b-1. Preparation of 1.3-dimethyl-1-(4-tert.-butyl-1.3.4-thiadiazolon-(5)-yl-(2))-urea:

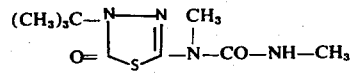

25.0g (0.1 mol) of 2-(N-methyl-N-chlorocarbonyl-amino)-4-tert.-butyl-1.3.4-thiadiazolin-5-one are dissolved in 125 ml of acetone. 17g (0.22 mol) of a 40% aqueous methylamine solution are added dropwise at room temperature, with stirring and cooling. Stirring is continued for 1 hour, 250 ml of water are added and the precipitated product is filtered off with suction. After drying, 21.0 g (86% of the theory) of 1,3-dimethyl-1-(4-tert.-butyl-1.3.4-thiadiazolon-(5)-yl-(2))-urea are obtained; m.p. 208°–209°C (recrystallized from ethanol).

b-2. Preparation of 1.3.3-trimethyl-1-(4-tert.-butyl-1.3.4-thiadiazolon-(5)-yl-(2))-urea:

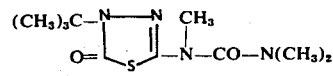

This urea compound is obtained by a method analogous to that above (b-1), utilizing dimethylamine instead of methylamine; m.p. C 86°–87°c (recrystallized from petrol for cleaning). The herbicidal activity of the urea compounds obtainable as set forth under (b-1) and (b-2) above is illustrated by the following Examples A and B:

EXAMPLE A

Post-emergence test

Solvent: 5 parts by weight acetone
Emulsifier: 1 part by weight alkylarylpolyglycol ether To produce a suitable preparation of active compound, 1 part by weight of active compound is mixed with the stated amount of solvent, the stated amount of emulsifier is added and the concentrate is then diluted with water to the desired concentration.

Test plants which have a height of 5–15 cm are sprayed with the preparation of the active compound so that the amounts of active compound per unit area which are stated in the Table are applied. Depending on the concentration of the spray liquor, the amount of water applied lies between 1000 and 2000 liters/hectare. After three weeks, the degree of damage to the plants is determined and characterised by the values 0–5, which have the following meaning:

0 no effect
1 a few slightly burnt spots
2 marked damage to leaves
3 some leaves and parts of stalks partially dead
4 plant partially destroyed
5 plant completely dead.

The active compounds, the amounts applied and the results can be seen from Table A.

Table A

| Active compound | Active compound applied kg/hectare | Echino-chloa | Cheno-podium | Sina-pis | Galin-soga | Stel-laria | Ur-tica | Ma-tri-caria | Oats | Cot-ton | Wheat | Car-rots |
|---|---|---|---|---|---|---|---|---|---|---|---|---|
| (b-1) $(CH_3)_3C-$ ... $-N-CO-NH-CH_3$ | 1 | 5 | 5 | 5 | 5 | 5 | 5 | 5 | 5 | 5 | 3 | 5 |
| | 0.5 | 5 | 5 | 5 | 5 | 5 | 5 | 5 | 5 | 5 | 2 | 5 |
| | 0.25 | 5 | 5 | 5 | 5 | 5 | 5 | 5 | 5 | 5 | 1 | 5 |
| $(CH_3)_3C-$ ... $-N-CO-N(CH_3)_2$ | 1 | 5 | 5 | 5 | 5 | 5 | 5 | 5 | 5 | 5 | 3 | 3 |
| | 0.5 | 5 | 5 | 5 | 5 | 5 | 5 | 5 | 5 | 5 | 2 | 2 |
| | 0.25 | 5 | 5 | 5 | 5 | 5 | 5 | 4 | 3 | 1 | 1 | |

EXAMPLE B

Pre-emergence test

Solvent: 5 parts by weight acetone
Emulsifier: 1 parts by weight alkylarylpolyglycol ether To produce a suitable preparation of active compound, 1 part by weight of active compound is mixed with the stated amount of solvent, the stated amount of emulsifier is added and the concentrate is then diluted with water to the desired concentration.

Seeds of the test plants are sown in normal soil and, after 24 hours, watered with the preparation of the active compound. It is expedient to keep constant the amount of water per unit area. The concentration of the active compound in the preparation is of no importance, only the amount of active compound applied per unit area being decisive. After three weeks, the degree of damage to the test plants is determined and characterised by the values 0–5, which have the following meaning:

```
0 no effect
1 slight damage or delay in growth
2 marked damage or inhibition of growth
3 heavy damage and only deficient
    development or only 50% emerged
4 plants partially destroyed after
    germination or only 25% emerged
5 plants completely dead or not emerged.
```

The active compounds, the amounts applied and the results obtained can be seen from Table B.

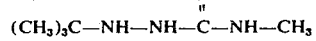
$$(CH_3)_3C-NH-NH-\overset{\overset{S}{\|}}{C}-NH-CH_3 \quad (1)$$

31.5 g (0.3 mole) of 4-methyl-thiosemicarbazide were introduced into 50 ml. of concentrated sulfuric acid at about 20°C., with slight cooling. 24.4 g (1.1 mole) of tert.-butanol were then added dropwise at 15° to 25°C and the mixture was stirred for a further 4 hours at room temperature. It was then poured into 250 ml. of ice-water and neutralized with half-concentrated sodium hydroxide solution. The product which has separated out was filtered off and washed with ligroin. 27 g. of 4-methyl-1-tert.-butyl-thiosemicarbazide of melting point 136°–138°C are obtained. As a result of recrystallization from petroleum ether, the melting point rises to 151°–152°C. The yield is 56% of theory.

Example 1b- Preparation of
4-methyl-1-tert.-butyl-thiosemicarbazide. (Variant b)

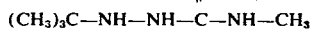
$$(CH_3)_3C-NH-NH-\overset{\overset{S}{\|}}{C}-NH-CH_3 \quad (1)$$

840 g. (8 moles) of 4-methyl-thiosemicarbazide were stirred in a mixture of 1,200 ml. of water and 760 g. of concentrated sulfuric acid at 50°C. until dissolved. 630 g. (8.5 moles) of tert.-butanol were then added and a Table B

| Active compound | Pre-emergence test Active compound applied kg/hectare | Echinochloa | Chenopodium | Sinapis | Oats | Cotton | heat |
|---|---|---|---|---|---|---|---|
| (CH₃)₃C—N——N CH₃<br>O=⸺S⸺N—CO—NH—CH₃<br>(b-1) | 5.0<br>2.5<br>1.25 | 5<br>5<br>4 | 5<br>5<br>5 | 5<br>5<br>5 | 5<br>2<br>1 | 5<br>1<br>0 | 5<br>2<br>1 |
| (CH₃)₃C—N——N CH₃<br>O=⸺S⸺N—CO—N(CH₃)₂<br>(b-2) | 5.0<br>2.5<br>1.25 | 5<br>5<br>5 | 5<br>5<br>5 | 5<br>5<br>5 | 5<br>3<br>2 | 5<br>1<br>0 | 5<br>1<br>0 |

The utility set forth above with respect to 4-methyl-1-tert.-butyl-thiosemicarbazide is applicable to all ureas synthesizable with the intermediate 1-tert.-butyl-thiosemicarbazide compounds of the instant invention.

The process of this invention is illustrated by the following preparative Examples.

EXAMPLE 1- Preparation of
4-methyl-1-tert.-butyl-thiosemicarbazide.

Example 1a- Preparation of
4-methyl-1-tert.-butyl-thiosemicarbazide. (Variant a)

further 3,200 g. of concentrated sulfuric acid were added dropwise at 50°C. The mixture was stirred for a further 5 hours at 50°C. and was then poured onto 5 kg. of ice. The mixture was twice extracted with 1.5 liters of chlorobenzene and the aqueous layer was rendered weakly alkaline by addition of sodium hydroxide solution (approximately 7.2 liters of concentrated solution). Hereupon, major amounts of sodium sulfate precipitate in addition to the reaction product. 6 liters of chloroform were added to the mixture, the whole was filtered and the salt cake was rinsed with chloroform.

The chloroform solutions were separated from the aqueous layer, dried over sodium sulfate and evaporated. 1 150 g. of 4-methyl-1-tert.-butyl-thiosemicarbazide of melting point 143°C.) were left as the residue. The yield was 89% of theory.

EXAMPLE 2- Preparation of 1-tert.-butyl thiosemicarbazide.

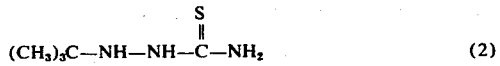   (2)

18.2 g. (0.2 mole) of thiosemicarbazide were dissolved in a mixture of 30 ml. of water and 20 g. of concentrated sulfuric acid. 30 g. (0.4 mole) of tert.-butanol were added thereto and a further 90 g. of concentrated sulfuric acid were then added dropwise at 50°C. The mixture was stirred for a further 5 hours at 50°C., cooled and poured onto 300 g. of ice. It was twice extracted with chloroform and the aqueous layer was then rendered alkaline by adding sodium hydroxide solution (about 140 ml. of 45% strength solution). The crystals which had precipitated were filtered off, washed with water and dried. 1.-tert.-butyl-thiosemicarbazide of melting point 190°C. (from ethanol) was obtained. The yield was 75% of theory.

The following compounds were obtained by methods analogous to that above.

| Example No. | Formula |
|---|---|
| 3 | (CH$_3$)$_3$C—NH—NH—C(=S)—NH—CH(CH$_3$)$_2$ |
| | Melting point 121–122°C. (from petroleum ether) |
| 4 | (CH$_3$)$_3$C—NH—NH—C(=S)—NH—C$_6$H$_5$ |
| | Melting point 138–139°C. (from petroleum ether) |
| 5 | (CH$_3$)$_3$C—NH—NH—C(=S)—NH—C$_6$H$_{11}$ |
| | Melting point 155°C. (from toluene/ligroin) |

It will be understood that the specification and examples are illustrative but not limitative of the present invention and that other embodiments within the spirit and scope of the invention will suggest themselves to those skilled in the art.

What is claimed is:

1. Process for the preparation of a 1-tert.-butyl-thiosemicarbazide compound of the formula

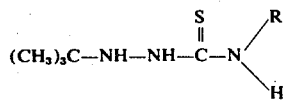

wherein
R is selected from the group consisting of hydrogen; alkyl, alkenyl or alkynyl of up to 16 carbon atoms; cycloalkyl of from 5 to 6 ring carbon atoms; aralkyl of up to 14 carbon atoms; aryl of up to 10 carbon atoms;
which process comprises reacting a thiosemicarbazide of the formula

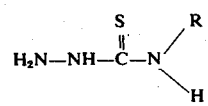

wherein R is identified as above, with tertiary butanol on the presence of a concentrated mineral acid as a dehydrating agent at a temperature of from 0° to 100°C.

2. Process as claimed in claim 1 wherein the dehydrating agent is sulfuric acid of at least 60% concentration by weight.

3. Process as claimed in claim 2 wherein the sulfuric acid is 70 to 85% concentrated by weight.

4. Process as claimed in claim 1 wherein said dehydrating agent is used in excess to act as a solvent.

5. Process as claimed in claim 1 wherein sulfuric acid of at least 60% concentration by weight is used as the dehydrating agent and the amount of said sulfuric acid is 4 times to 10 times the amount by weight of the thiosemicarbazide reactant employed.

6. Process as claimed in claim 1 in which there is used a solvent.

7. Process as claimed in claim 6 wherein said solvent is an aliphatic or aromatic hydrocarbon.

8. Process as claimed in claim 9 wherein said solvent is an aliphatic or cyclic ether.

9. Process as claimed in claim 1 wherein the reaction is effected at a temperature between 30° and 70°C.

10. Process as claimed in claim 1 wherein R is other than hydrogen.

11. Process as claimed in claim 10 wherein from 1.1 to 1.3 mols of tert.-butanol are used per mole of thiosemicarbazide.

12. Process as claimed in claim 1 wherein R is hydrogen.

13. Process as claimed in claim 12 wherein 2.2 to 2.5 mols of tert.-butanol are used per mol of thiosemicarbazide.

14. Process as claimed in claim 1 wherein said compound is 4-methyl-1-tert.-butyl-thiosemicarbazide.

15. Process as claimed in claim 1 wherein said compound is 1-tert.-butyl thiosemicarbazide.

* * * * *

UNITED STATES PATENT OFFICE
CERTIFICATE OF CORRECTION

PATENT NO. : 3,907,887
DATED : September 23, 1975
INVENTOR(S) : Klaus Sasse

It is certified that error appears in the above-identified patent and that said Letters Patent are hereby corrected as shown below:

Column 10, claim 8, line 1, cancel "9" and substitute therefor -- 6 --.

Signed and Sealed this tenth Day of February 1976

[SEAL]

Attest:

RUTH C. MASON
Attesting Officer

C. MARSHALL DANN
Commissioner of Patents and Trademarks